United States Patent
Manning (10) Patent No.: US 11,255,472 B2
(45) Date of Patent: Feb. 22, 2022

(54) COUPLING FOR FORMING A SEALED JOINT BETWEEN FIRST AND SECOND TUBULAR MEMBERS

(71) Applicant: ACORN INTELLECTUAL PROPERTIES LTD, Jersey (GB)

(72) Inventor: John Manning, Norwich Norfolk (GB)

(*) Notice: Subject to any disclaimer, the term of this patent is extended or adjusted under 35 U.S.C. 154(b) by 278 days.

(21) Appl. No.: 16/314,343

(22) PCT Filed: Jun. 28, 2017

(86) PCT No.: PCT/GB2017/051881
§ 371 (c)(1),
(2) Date: Dec. 28, 2018

(87) PCT Pub. No.: WO2018/002608
PCT Pub. Date: Jan. 4, 2018

(65) Prior Publication Data
US 2019/0154175 A1 May 23, 2019

(30) Foreign Application Priority Data
Jun. 30, 2016 (GB) .................................. 1611355.7

(51) Int. Cl.
*F16L 25/14* (2006.01)
*F16L 21/02* (2006.01)
*F16L 37/14* (2006.01)

(52) U.S. Cl.
CPC ........... *F16L 21/022* (2013.01); *F16L 37/148* (2013.01); *F16L 25/14* (2013.01)

(58) Field of Classification Search
CPC ....... F16L 37/142; F16L 37/14; F16L 37/148; F16L 21/022; F16L 25/14
(Continued)

(56) References Cited

U.S. PATENT DOCUMENTS 1,801,171 A * 4/1931 Mueller .................. F16L 13/08
285/289.5
2,456,048 A * 12/1948 Carpenter ............... F16L 21/08
285/382
(Continued)

FOREIGN PATENT DOCUMENTS

DE        3203054 A1    9/1982
DE   202013105306 U1    2/2015
(Continued)

OTHER PUBLICATIONS

United Kingdom Intellectual Property Office, Application No. GB 1611355.7, Combined Search and Examination Report under Sections 17 and 18(3) dated Jan. 13, 2017.
(Continued)

*Primary Examiner* — David Bochna
(74) *Attorney, Agent, or Firm* — David B. Tingey; Bryant J. Keller; Kirton McConkie (57) ABSTRACT

The invention concerns a coupling for use in forming a sealed joint between first and second tubular members. The coupling provides a through-passage defined by an inner coupling face and having a first open end for insertion of the first tubular member into a first region of the through-passage and a second open end for insertion of the second tubular member into a second region of the through-passage. A first inwardly directed engagement recess is provided in the inner coupling face in the first region of the through-passage and a second inwardly directed engagement recess is provided in the inner coupling face in the second region of the passage. In the assembled joint, the first inwardly directed engagement recess aligns with a first outwardly directed engagement recess of the first tubular member to form a first channel for receipt of a first retainer to secure the first tubular member in the coupling. The second inwardly directed recess aligns with a second outwardly directed (Continued)

engagement recess of the second tubular member to form a second channel for receipt of a second retainer to secure the second tubular member in the coupling. The first region of the through-passage has a larger diameter than the second region of the through-passage.

15 Claims, 5 Drawing Sheets

(58) Field of Classification Search
USPC .................................................. 285/321, 305
See application file for complete search history.

(56) References Cited

U.S. PATENT DOCUMENTS

| | | | | |
|---|---|---|---|---|
| 2,597,482 | A * | 5/1952 | Harrison | F16L 37/148 285/305 |
| 3,245,702 | A * | 4/1966 | Smith | F16L 37/148 285/305 |
| 3,680,894 | A * | 8/1972 | Young | F16L 25/14 285/112 |
| 3,759,553 | A * | 9/1973 | Carter | F16L 37/148 285/260 |
| 3,920,270 | A * | 11/1975 | Babb, Jr. | F16L 17/035 285/104 |
| 3,977,705 | A * | 8/1976 | Thiessen | F16L 25/14 285/112 |
| 4,186,946 | A * | 2/1980 | Snow | F16L 37/14 285/94 |
| 4,289,339 | A * | 9/1981 | Hansen | F16L 37/146 285/305 |
| 4,822,077 | A * | 4/1989 | Hendrickson | F16L 25/14 285/112 |
| 5,056,833 | A * | 10/1991 | Webb | F16L 25/14 285/148.23 |
| 5,816,625 | A * | 10/1998 | Clarke | F16L 37/148 285/305 |
| 5,911,447 | A | 6/1999 | Ball | |
| 6,102,447 | A * | 8/2000 | Aldridge | F16L 37/0885 285/305 |
| 6,494,493 | B1 * | 12/2002 | Baruh | F16L 21/002 138/97 |
| 6,921,114 | B1 * | 7/2005 | Washburn | F16L 37/148 285/305 |
| 7,086,131 | B2 * | 8/2006 | Gibb | F16L 25/14 |
| 7,108,295 | B1 * | 9/2006 | Zarynow | F16L 37/148 285/294.1 |
| 8,746,748 | B2 * | 6/2014 | Kern-Emmerich | F16L 37/148 285/305 |
| 2010/0007136 | A1 * | 1/2010 | Subbaraman | F16L 37/148 285/66 |
| 2014/0319824 | A1 * | 10/2014 | Manning | F16L 37/148 285/321 |
| 2015/0276103 | A1 | 10/2015 | Manning | |
| 2018/0180203 | A1 * | 6/2018 | Yashin | F16L 37/148 |
| 2018/0245722 | A1 * | 8/2018 | Yashin | F16L 37/148 |

FOREIGN PATENT DOCUMENTS

| | | |
|---|---|---|
| EP | 3032146 A1 | 3/1981 |
| FR | 1397378 A | 4/1965 |
| GB | 2464672 A | 4/2010 |
| GB | 2514608 A | 12/2014 |
| WO | 2014049375 A1 | 4/2014 |
| WO | 2018002608 A1 | 1/2018 |

OTHER PUBLICATIONS

PCT International Search Report for International Application No. PCT/GB2017/051881 (WO2018002608) dated Oct. 20, 2017.

* cited by examiner

COUPLING FOR FORMING A SEALED JOINT BETWEEN FIRST AND SECOND TUBULAR MEMBERS

FIELD

The present invention relates to improvements in and relating to couplings for forming joints between tubular members, and in particular, but without limitation, to couplings used in pipe joints for use in oil distribution networks and the like.

BACKGROUND

Oil distribution pipes can be very long, often several miles in length. As such, they are usually formed of multiple individual pipe lengths which are sealingly coupled to one another through pipe joints. The pipe joint is required to form a mechanical connection between adjacent pipe lengths and also to ensure that this connection is sealed against egress of fluid from the pipe. Where the pipe is formed of metal tube, joints can be formed by abutting the ends of adjacent pipe lengths and welding around their entire circumference but this can be a time-consuming process and welds must be tested after they are formed, with remedial action frequently being needed to ensure that a full seal is achieved.

Alternative pipe joints are known, such as that disclosed in published PCT application No: WO2014049375, which concerns a pipe joint made with a coupling formed as a tubular sleeve that receives the ends of two adjacent pipe lengths. Pipe joints of this type shall herein be referred to as "wrap-around connector joints".

In the wrap-around connector joint disclosed in WO2014049375, the coupling is tubular and its first and second ends are both open to respectively receive the ends of first and second pipe lengths, which may abut one another within the coupling. To form a mechanical connection to the first pipe length, the coupling has an inwardly facing annular recess formed around its inner cylindrical face toward its first end. The first pipe length is provided on its outer cylindrical face with a complementary outwardly facing annular recess. When the first pipe length is inserted in the coupling, its outwardly facing recess is aligned with the inwardly facing recesses of the coupling, forming an annular channel. An elongate retainer, such as a spring, rod or wire, is then fed circumferentially into the annular channel. By engaging with the annular recesses of both the coupling and the pipe end, the retainer forms a mechanical connection which resists subsequent withdrawal of the first pipe length from the coupling. To connect to the second pipe length, the coupling has a second inwardly facing annular recess toward its second end, which likewise aligns in the assembled joint with an outwardly facing recess on the second pipe length and receives a second retainer to keep the second pipe lengthin position.

The coupling of WO2014049375 is provided with internal seals. In most of the embodiments described, these take the form of O ring seals received in further inwardly facing recesses in the inner cylindrical face of the tubular coupling, to contact and seal against the outer faces of the pipe lengths and so prevent egress of fluid from, and/or ingress of contamination to, the pipe.

Wrap-around connector joints of this general type provide a number of advantages, including relative ease of assembly.

Pipe joints are not only used for connecting one pipe length directly to another. Long pipes generally need to be provided, at intervals, with pressure gauges, valves, unions, T-joints etc. (hereinafter, generally referred to as "accessories" or in the singular as "an accessory"), and these can be connected in-line between adjacent pipe lengths relatively easily using wrap-around connector joints. The accessory may be provided with a spigot for receipt in the tubular coupling used to form the joint.

However, once a pipe has been installed, it is difficult, when using wrap-around connector joints, to remove an accessory because to do so involves axial displacement of the accessory or coupling to free the it from the pipe end to which it has been connected. The difficulty arises on two fronts: first, it may not be possible to separate the pipe ends connecting to opposite sides of the accessory sufficiently for the accessory's spigots to clear the pipe ends; and second, unless the ends of the pipe lengths have a smooth, machined finish, sliding of the coupling inevitably damages the O-ring seals. In relation to the latter, providing a machined finish to the ends of every pipe length is extremely expensive, and mostly a wasted cost, because for the lifetime of a pipe possibly containing several hundred or thousand pipe lengths, only a few may ever need to be inspected, repaired or replaced. The O ring seals may also foul the recesses used to form the mechanical coupling as the joint is slid apart, leading to fouling, or to damage to the seal.

In order to overcome this, in pipes in which wrap-around connector joints are used, it is established practice to use an adapter between the pipe end and the accessory. The adapter comprises, at one end (i.e. on its spigot), an external groove, which can connect to the coupling of a wrap-around connector joint (in the manner previously described); and at its other end, a flange, which can be bolted to the accessory. The adapter thus permits the interoperability of bolted-flange and wrap-around connector joints in a single pipe; and also obviates the problem of needing to axially displace the accessory to free it from the pipe.

Clearly, however, the use of adapters: increases the number of joints in the pipe, thereby increasing the chances of a leak or other problems; increases the burden of maintenance, inspection and repair (as there are more connections to check); and increases the cost of the pipe.

SUMMARY

To overcome these problems the present invention provides a pipe coupling which is capable of relatively straightforward disassembly.

The present invention provides a coupling, a joint and a method as set out in the appended claims.

According to one aspect of the invention, there is provided a coupling for use in forming a sealed joint between first and second tubular members, the coupling providing a through-passage defined by an inner coupling face and having: a first open end for insertion of the first tubular member into a first region of the through-passage the first open end having a first inwardly directed engagement recess, which is provided in the inner coupling face in the first region of the through-passage, the first inwardly directed engagement recess being alignable, in use, with a first outwardly directed engagement recess of the first tubular member to form a first channel for receipt of a first retainer to secure the first tubular member in the coupling; and a second open end for insertion of the second tubular member into a second region of the through-passage, the second open end having a second inwardly directed engagement recess, which is provided in the inner coupling face in the second region of the through-passage, the second inwardly directed recess being alignable, in use, with a second outwardly directed engagement recess of the second tubular member to form a second channel for receipt of a second retainer to secure the second tubular member in the coupling, the coupling being characterised by: the first region of the through-passage having a larger diameter than the second region of the through-passage.

The invention is characterised by the first region of the through-passage having a larger diameter than the second region of the through-passage, and this provides a number of advantages, namely:

The first seal can have an internal diameter, which is larger than an external diameter of the second tubular member, which may permit the coupling to be axially displaced relative to the first and/or second tubular members with a clearance between the first seal and the second outwardly directed engagement recess of the second tubular member. During said relative axial displacement, the first seal may not be caused to roll out of its recess by interference between the second tubular member and the first seal, and/or by interference between the second outwardly directed engagement recess of the second tubular member and the first seal.

Additionally or alternatively, the second seal may have an outer diameter, which is smaller than an internal diameter of the first region, which may permit the coupling to be axially displaced relative to the first and/or second tubular members with a clearance between the second seal and the first inwardly directed engagement recess of the coupling. During said relative axial displacement, the second seal may not be caused to roll out of its recess by interference between the coupling and the second seal, and/or by interference between the first inwardly directed engagement recess of the coupling and the second seal.

In certain respects, the invention provides a tubular coupling, which has a larger inner-diameter end, and a smaller inner-diameter end for receiving, respectively, a larger outer-diameter pipe, and a smaller outer-diameter pipe. The pipes can be secured in their respective ends of the coupling by first and second retainers, which fit into respective channels formed by recesses formed on an inner wall of the coupling, and grooves formed in the outer walls of the pipe ends. This forms a mechanical connection between each pipe end and the coupling, which prevents axial displacement of the pipes relative to the coupling. In order to function as an effective pipe coupling, however, a seal between the coupling and each pipe end is required. This sealing is formed by O-ring seals, which seat in grooves of the pipe/coupling.

One problem that the invention seeks to address, is how to disassemble the connection. In almost all situations, the pipes will be laid end-to-end in a row, which prevents their axial displacement, and thus removal from their respective ends from a known coupling. Thus, it is not possible to axially retract either pipe, in use, to free it from a known coupling: the pipes are only free to move transverse to the axis of the pipe. The solution provided by the invention is therefore, rather than axially displacing the pipes, to slide the coupling relative to the pipes. By such sliding, the coupling may eventually pass-by one end of one of the pipes, enabling the pipe to be displaced transverse to the axis of the pipe.

In known couplings, where O-ring seals are used, this type of sliding tends to cause the O-ring seals to be rolled out of their retaining grooves—especially where the edge of a channel passes over the O-ring seal. Even if the O-ring is not completely displaced out of its retaining groove by such sliding, it can still, nevertheless, be "pinched", which can damage it—thereby degrading the seal.

The solution provided by the invention can, in certain respects, be briefly summarised as making one end of the coupling with a larger internal diameter such that there is clearance between the coupling and the O-ring seal(s) when the coupling is slid relative to the pipes. Neither this solution, nor its associated benefits, is known from, nor rendered obvious by the prior art.

GB2464672 and WO2014049375 (by the same inventor as the present application), for example, have identically-sized pipe ends, and the present invention specifically addresses the aforesaid problem, which is present in GB2464672 and WO2014049375. Also, in, for example, GB5214608, the pipes have the same outer diameters, and the "coupling" is formed in two parts that nest one inside the other when brought together, which is nothing like the present invention.

Step-down connectors, such as those described in US2011127769 are known, but because the bolts are located axially inwardly of the seals, the problem of O-ring rolling is not present as the bolt holes do not pass over the seals. Moreover, the configuration shown in US2011127769 would requires additional sealing because the bolts (rather than retainers) are located inside the region formed by the seals, whereas in the present invention, the retainers are located outside the "sealed envelope" provided by the seals.

The inner coupling face may comprise a first seal recess in the first region of the through-passage. The first inwardly directed engagement recess is suitably (located) between the first open end and the first seal recess.

The first seal recess is suitably a circumferential recess and the coupling may further comprise a seal received in the first seal recess and arranged to seal against an outer face of the first tubular member in use. The first seal and the second region of the coupling may each have an internal diameter, the internal diameter of the second region of the coupling being larger than the internal diameter of the first seal.

A first insertion channel may be provided, leading from an outer surface of the coupling to the first inwardly directed engagement recess, to enable the first retainer to be inserted into the first channel in use. A second insertion channel leading from an outer surface of the coupling to the second inwardly directed engagement recess may be provided, to enable the second retainer to be inserted into the second channel in use.

Another aspect of the invention provides a joint comprising a coupling as described herein, a first tubular member received in the first region of the coupling and a second tubular member received in the second region of the coupling, wherein the first tubular member has a larger outer diameter than the second tubular member.

The second tubular member suitably has an outwardly directed seal recess carrying a second seal which is arranged to seal against the inner coupling face. The second inwardly directed engagement recess may be (located) between the outwardly directed seal recess and the second end of the coupling.

One of the first and second tubular members may be a spigot attached to an accessory.

The first inwardly directed engagement recess of the coupling suitably aligns with the first outwardly directed recess of the first tubular member to form the first channel. The first retainer is suitably received in the first channel to secure the first tubular member in the coupling. The second inwardly directed recess of the coupling may therefore align with the second outwardly directed recess of the second tubular member to form the second channel, and the second retainer may thus be received in the second channel to secure the second tubular member in the coupling.

A further aspect of the invention provides a method of disassembling a joint as described herein, the method comprising the steps of: withdrawing the first retainer, withdrawing the second retainer, sliding the coupling toward the second tubular member causing the coupling to disengage from the first tubular member, and moving one of the first and second tubular members laterally relative to the other.

Other aspects of the invention may provide coupling substantially as herein described with reference to, and as illustrated in, the accompanying drawings and/or a joint substantially as herein described with reference to, and as illustrated in the accompanying drawings.

DESCRIPTION OF FIGURES

Specific embodiments of the present invention will now be described, by way of example only, with reference to the accompanying drawings, in which.

DETAILED DESCRIPTION

The embodiment of the invention depicted in FIGS. 1 to 7 comprises a coupling 10 (depicted most clearly in FIGS. 1 and 2) which is a generally cylindrical tubular component. It may comprise metal. For underwater applications, it preferably comprises a corrosion resistant material. Stainless steel is suitable. The coupling 10 has a first open end 12 and a second open end 14, and extending between the ends is a through-going passage 16. The passage is of circular cross section and comprises a first region 18 including the first open end 12 and a second region 20 including the second open end 14. The first region 18 of the passage is of larger diameter than its second region 20. In the illustrated embodiment, the difference in diameters is small. A shallow shoulder 22 provides a transition from the first, larger diameter, region 18 to the second, smaller diameter region 20. This transition could take other forms. The passage 16 has a cylindrical inner coupling face 24.

Figure 1:
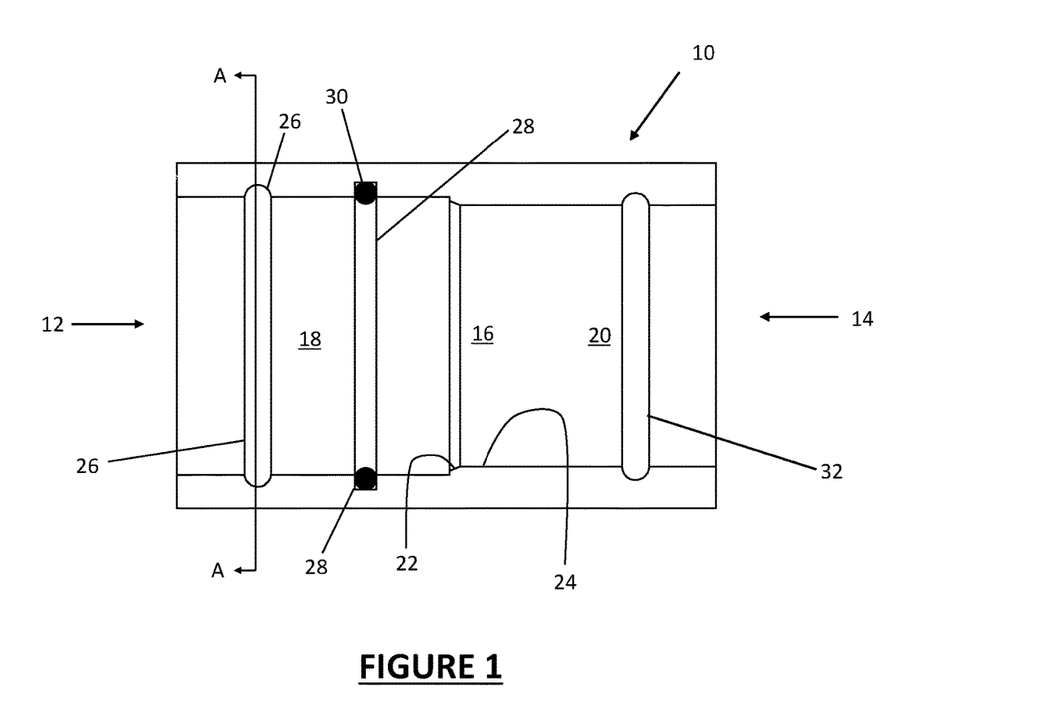
FIG. 1 is a section in an axial plane through a coupling embodying the present invention.
Figure 2:
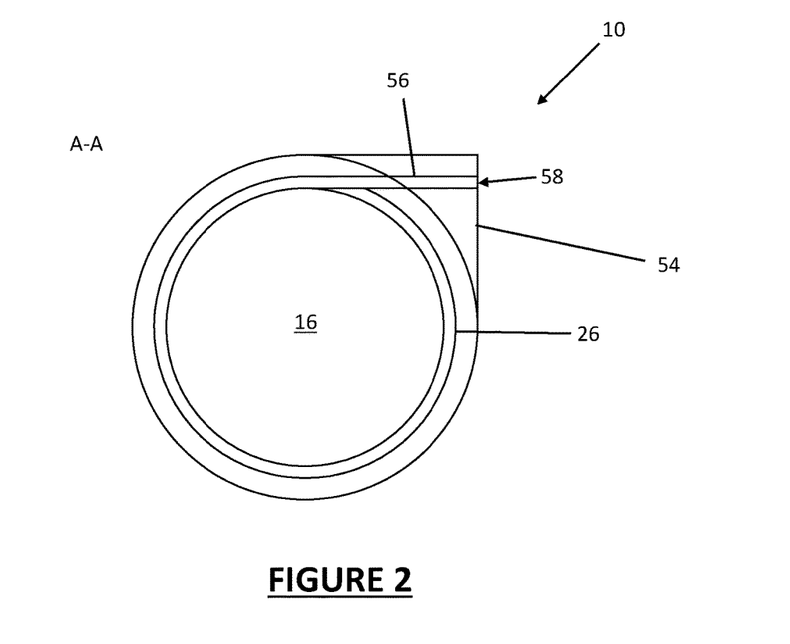
FIG. 2 is a section through the same coupling in a radial plane.

Formed in the inner coupling face 24, and within the first region 18, are (a) a first inwardly directed engagement recess 26 and (b) a first seal recess 28 which is inwardly directed. The first seal recess 28 receives a first seal 30. In the present embodiment, this is formed as an "O" ring seal of generally conventional type, comprising elastomeric material. Also formed in the inner coupling face 24, in the second region 20, is a second inwardly directed engagement recess 32.

In the present embodiment the recesses 26, 28, 32 are all annular and each extend along a circumference of the cylindrical coupling 10. The first seal recess 28 is in this example flat bottomed with sides lying in a radial plane, suitably to cooperate with the first seal 30 to form a fluid seal. The first and second inwardly directed engagement recesses 26, 32 have in this example a curved, concave cross-section. More specifically their shape is semi-circular. However, the form of any or all of the recesses may be different in other embodiments of the invention.

To appreciate how the coupling 10 functions, consider FIGS. 3 to 6. In this example the coupling 10 is being used to form a sealed, fluid-conducting joint between first and second tubular members in the form of a pipe 34, and a spigot 36 formed upon an accessory. The accessory is to be incorporated into a pipeline. Purely by way of example it may be a valve, pressure gauge or 'T' connector. The spigot 36 is cylindrical and tubular and has a machined outer face 38 which is a close sliding fit in the first region 18 of the coupling 10. In the outer face 38 of the spigot 36 is a first outwardly directed engagement recess 40.

The pipe 34 is of smaller external diameter than the spigot 36. The pipe 34 is a close sliding fit in the second region 18 of the coupling.

Figure 3:
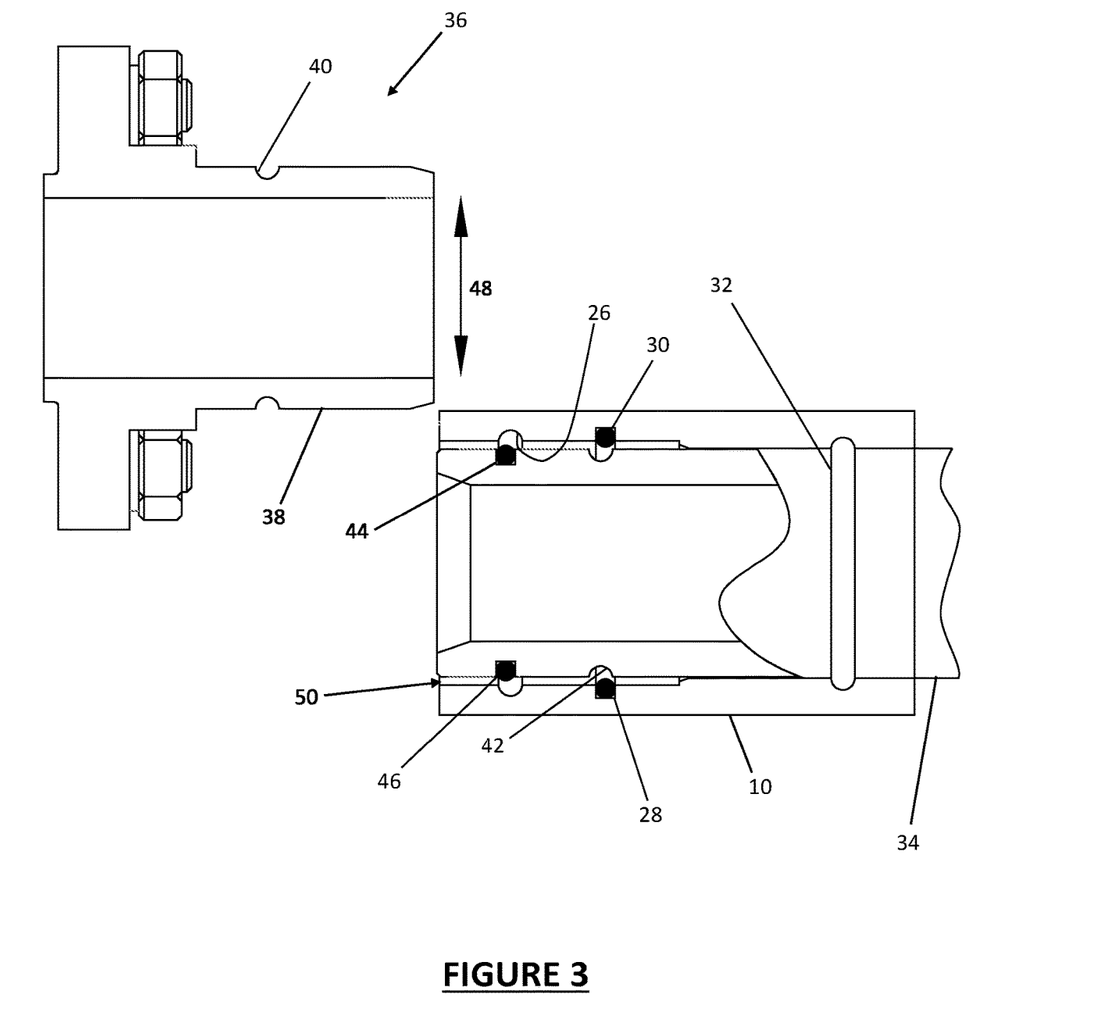
FIG. 3 is a section in an axial plane through a disassembled pipe joint embodying the present invention, pipe components of the joint being misaligned from one another.
Figure 4:
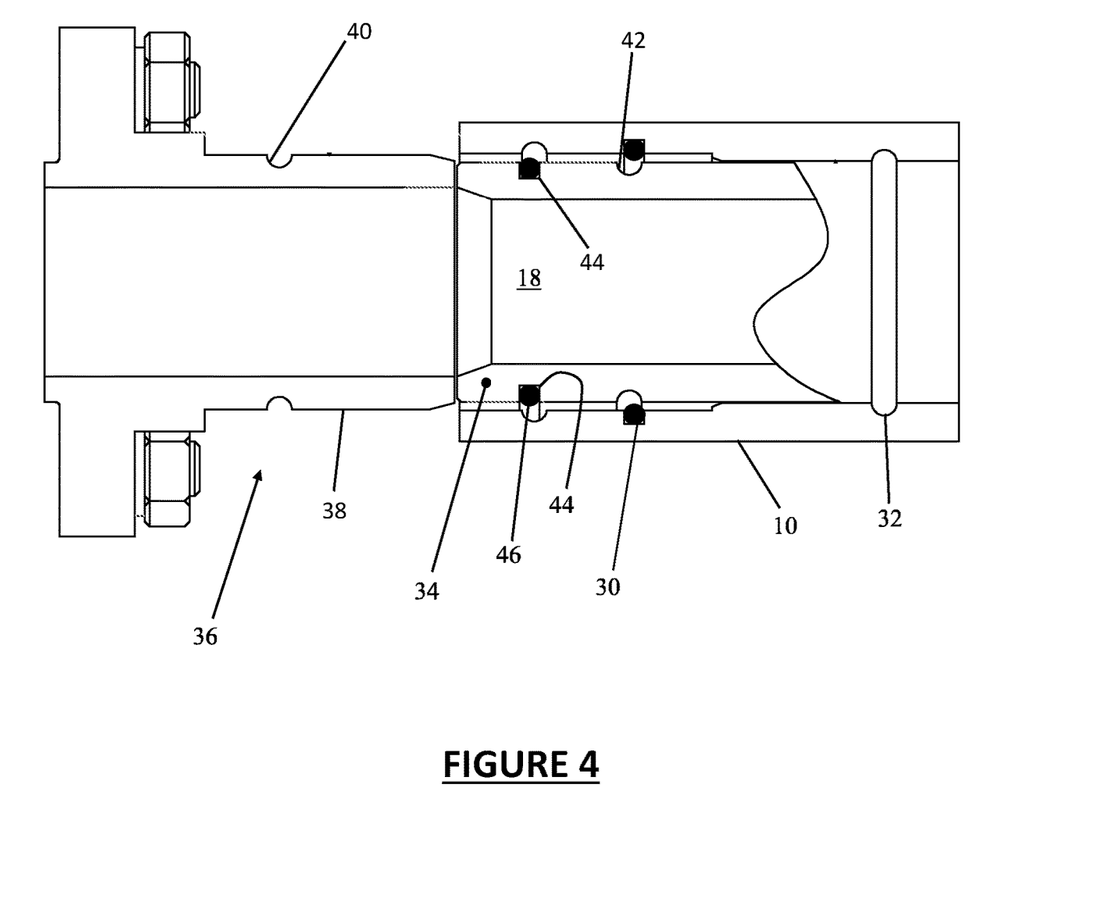
FIG. 4 is similar to FIG. 3 but shows the pipe components in alignment before the coupling is slid into place to form the joint.
Figure 5:
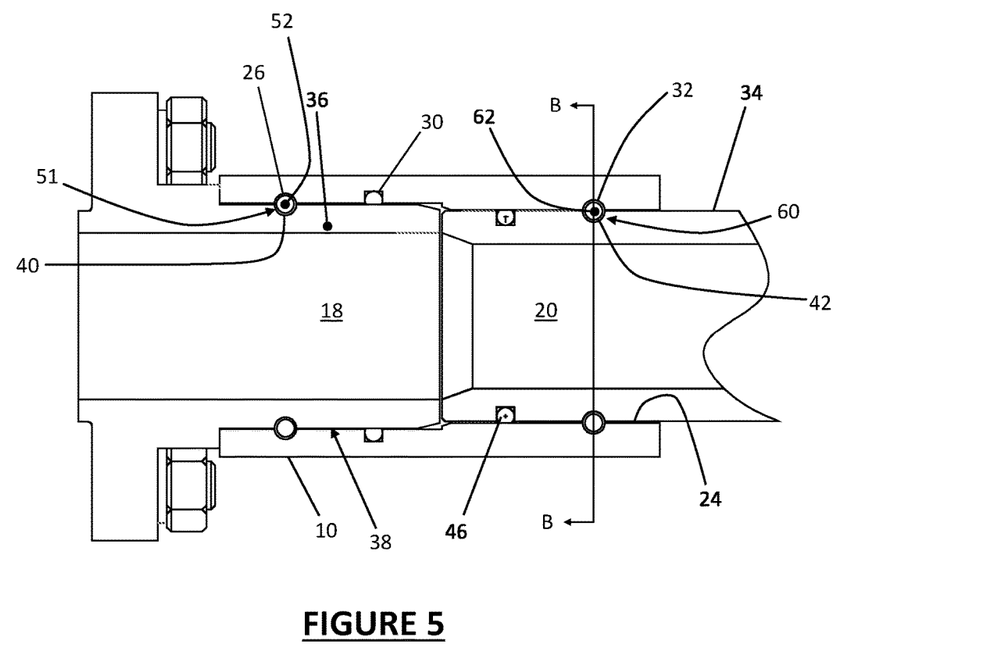
FIG. 5 is similar to FIG. 4 but shows the coupling after it is slid into place to form the joint.

An end portion of the pipe 34 comprises recesses used in forming the pipe joint. Specifically, it has (a) a second outwardly directed engagement recess 42 and (b) a second seal recess 44, which is also outwardly directed. The second seal recess is seen in FIGS. 3-5 to receive a second seal 46 which is formed as an "O" ring seal of generally conventional type, comprising elastomeric material. The second seal 46 is of somewhat larger diameter than the first seal 30. Specifically, the first seal 30 is able to pass through the second seal 46 without one fouling on the other. In the present embodiment the first seal 30 has an inner diameter which is larger than the external diameter of the second seal 46.

In the configuration depicted in FIG. 3, the joint is disengaged. The coupling 10 has been slidfully onto the pipe 34 so that the coupling 10 does not project beyond the end of the pipe 34. This makes it easy to bring ends of the pipe 34 and the spigot 36 into alignment by moving them laterally (along the direction of arrow 48 in FIG. 3) even though there is little axial clearance between them, to achieve the configuration seen in FIG. 4 in which the spigot and pipe are aligned, with their axes generally coincident and parallel.

The internal diameter of the first region 18 of the coupling 10 is somewhat larger than the external diameter of the pipe 34. Clearance between them is indicated by arrow 50 in FIG. 3. As a result, the coupling 10 is able to slide along the pipe 34 without fouling. In particular, the first seal 30 is able to move past both the second seal 46 and the second outwardly directed engagement recess 42 without being snagged or damaged. Likewise, the first inwardly directed engagement recess 26 can if necessary move past the second seal 46 without that seal being snagged or damaged.

When the spigot 36 and the pipe 34 have been aligned, as in FIG. 4, the coupling 10 can be advanced (to the left in FIG. 4) to achieve the connected configuration depicted in FIG. 5. Here, the spigot 36 is received in the first portion 18 of the coupling. The first outwardly directed engagement recess 40 formed on the spigot is aligned with the first inwardly directed engagement recess 26, in the sense that they lie at a common axial position, one within the other, so that together they form a first annular channel 51. In FIG. 5 a first retainer 52 has been inserted into this channel. Looking at FIG. 2, it can be seen that the otherwise cylindrical coupling 10 has an ear portion 54, and that a first insertion channel 56 with an open end 58 leads through the ear portion 54, along a tangent, to the first inwardly directed engagement recess 26 in the coupling. Hence when the engagement recesses are suitably aligned, as in FIG. 5, the retainer 52 can be inserted through the channel 56 into the first annular channel 51 between the spigot 36 and the coupling 10, to lock the spigot axially with respect to the coupling 10. The first retainer 52 is not seen in FIG. 2 but can take the form of an elongate, cylindrical member. It has sufficient flexibility to curve around the circumference of the joint. It may be provided with means for securing it in place in the joint. It may be provided with a pulling feature—e.g. a handle—to enable it to be pulled out of the joint to enable its disassembly. It may be a circular rod or a helical spring, and may comprise elastomer or suitably flexible metal.

Looking again at FIG. 5 it can be seen that the first seal 30 acts radially against the outer face 38 of the spigot 36. The seal is somewhat compressed and as a result is able to resist fluid egress between the coupling 10 and the spigot 36. Note that during assembly and disassembly of the joint, the first seal runs only over the spigot's face 38, which can be formed with a smooth finish (e.g. by machining) to avoid snagging of the seal or damage to it.

Figure 6:
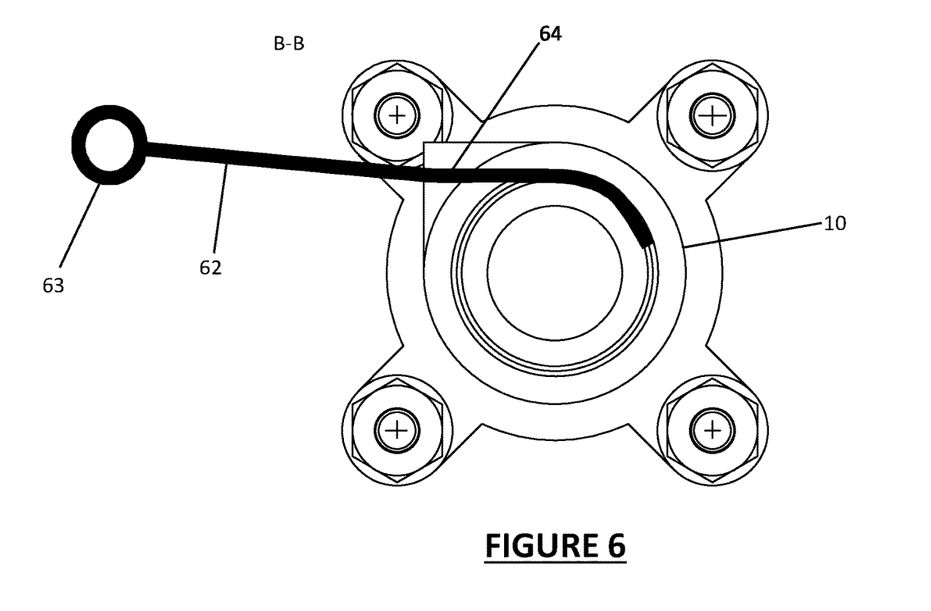
FIG. 6 is a section through the joint depicted in FIG. 5, in a radial plane.

Looking now at the engagement between the coupling 10 and the pipe 34, it can be seen in FIG. 5 that the end portion of the pipe 34 is received in the second portion 20 of the coupling 10. The second outwardly directed engagement recess 42 formed upon the pipe 34 is in alignment with the second inwardly directed engagement recess 32 formed upon the coupling 10, to form a second annular channel 60. A second retainer 62 is received in and extends through the second annular channel 60 to lock the pipe 34 axially with respect to the coupling 10. The coupling 10 has a second insertion channel 64 similar to the first insertion channel 56 but aligned with the second inwardly directed engagement recess 32, to enable insertion of the second retainer 62 into the second annular channel 60. FIG. 6 shows the second retainer 62 partially inserted in the second annular channel 60, and also shows a handle 63 which can be used to pull the retainer 62 to withdraw it.

Looking again at FIG. 5 it can be seen that the second seal 46 acts radially against the inner coupling face 24 of the coupling 10 to resist egress of fluid between the coupling 10 and the pipe 34.

Figure 7:
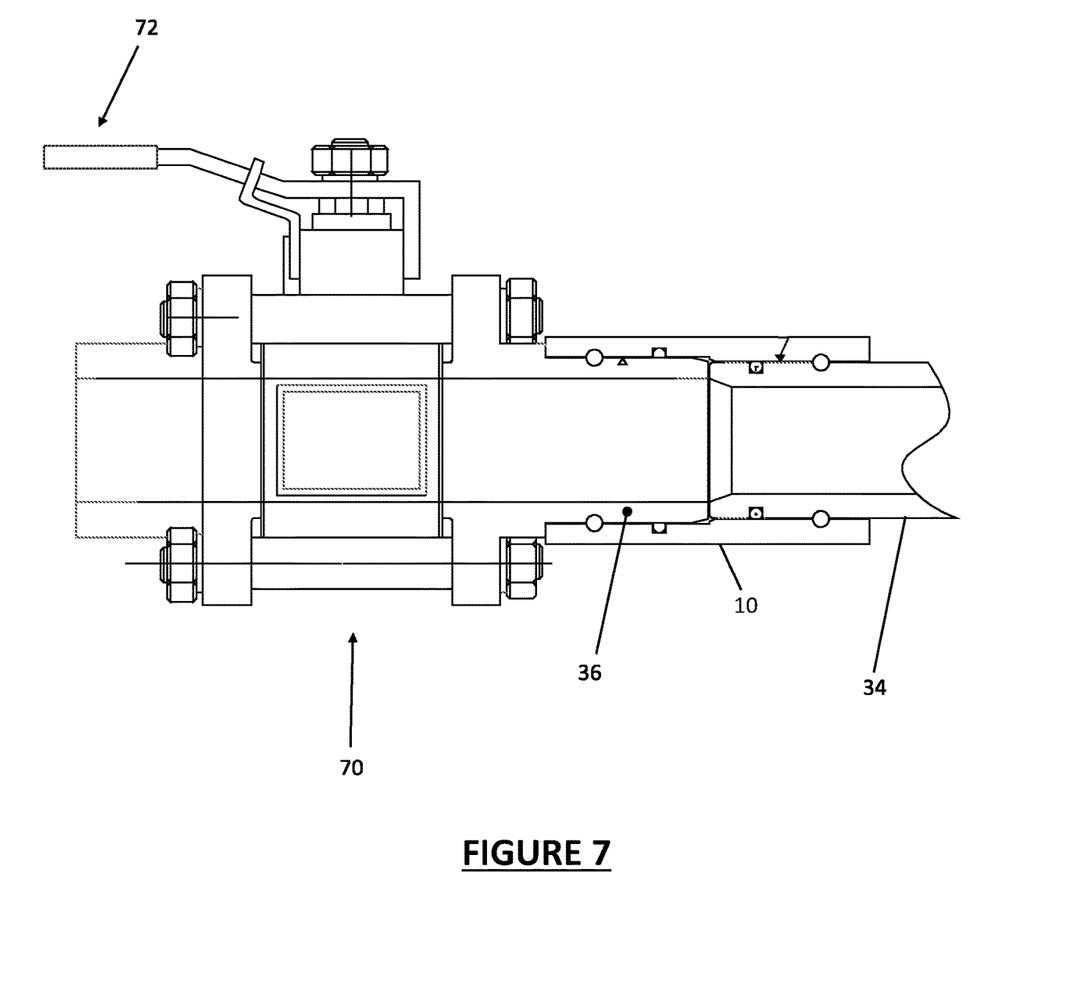
FIG. 7 is similar to FIG. 5 but additionally depicts an accessory.

In FIG. 7 it can be seen that the accessory on which the spigot 36 is formed takes the form—in this arbitrary example—of a valve 70 having a valve lever 72. The accessory could of course have two (or more) spigots to form multiple joints of the above described type.

Disassembly of the joint is straightforward. The first and second retainers 52, 62 are pulled out of their respective channels. The coupling 10 can then be slid back to the position shown in FIG. 3 to disengage it from the spigot 36, after which for example the accessory 70 can be removed for inspection, replacement etc. This is easily done even where it is not possible to axially separate the accessory from the pipe 34, due to the sliding action of the coupling 10.

Note that in order to slide the coupling 10 back from its engaged position (FIG. 5) to the disengaged position of FIG. 3, it is not necessary to move the first seal 30 past the first outwardly directed engagement recess 40 formed on the spigot because that recess 40 (and correspondingly the first inwardly directed engagement recess 26 on the coupling 10) lies between the first seal recess 28 and the first open end 12 of the coupling 10. Hence there is no risk of the first seal 30 snagging on the first outwardly directed engagement recess 40. The first seal 30 does move past the second seal 46 and the second outwardly directed engagement recess 42 as the coupling 10 is slid back, but it does not foul those parts due to the enlarged internal diameter of the first region 18 of the coupling 10, and the consequent clearance 50. The internal diameter of the first seal 30 is, in the present embodiment, slightly larger than the internal diameter of the second region 20 of the coupling, and slightly larger than the external diameter of the pipe 34. Hence the first seal 30 can easily move along the pipe 34 without snagging on it. The second seal 46, being received by the pipe 34 and not by the coupling 10, does not move as the coupling 10 is slid back. Because the second inwardly directed engagement recess 32 lies closer to the second open end 14 of the coupling 10 than the seal 46, it is incapable of fouling the seal 46. The result is that the coupling 10 can be slid back and forth to engage/disengage the joint without fouling of either of the seals 30, 46.

The present embodiment is presented by way of example and not limitation. Numerous variants are possible without departing from the scope of the invention as defined by the appended claims.

What is claimed is:

1. A coupling for use in forming a sealed joint between a first tubular member and a second tubular member, the coupling providing a through-passage defined by an inner coupling face and having:
   a first open end for insertion of the first tubular member into a first region of the through-passage the first open end having a first inwardly directed engagement recess, which is provided in the inner coupling face in the first region of the through-passage, the first inwardly directed engagement recess being alignable, in use, with a first outwardly directed engagement recess of the first tubular member to form a first channel for receipt of a first retainer to secure the first tubular member in the coupling; and
   a second open end for insertion of the second tubular member into a second region of the through-passage, the second open end having a second inwardly directed engagement recess, which is provided in the inner coupling face in the second region of the through-passage, the second inwardly directed recess being alignable, in use, with a second outwardly directed engagement recess of the second tubular member to form a second channel for receipt of a second retainer to secure the second tubular member in the coupling,
   wherein:
   the first region of the through-passage has a larger diameter than the second region of the through-passage,
   the inner coupling face comprises a first seal recess in the first region of the through-passage,
   the first seal recess comprises a circumferential recess and the coupling further comprises a first seal received in the first seal recess and arranged to seal against an outer face of the first tubular member, in use,
   the first seal has an internal diameter, which is larger than an external diameter of the second tubular member, and
   the larger internal diameter of the first seal being larger than the external diameter of the second tubular member permits the coupling to be axially displaced relative to the first and/or second tubular members with a clearance between the first seal and the second outwardly directed engagement recess of the second tubular member.

2. The coupling of claim 1, wherein the first inwardly directed engagement recess is located between the first open end and the first seal recess.

3. The coupling of claim 1, wherein during said relative axial displacement, the first seal is not caused to roll out of its recess by interference between the second tubular member and the first seal.

4. The coupling of claim 1, wherein during said relative axial displacement, the first seal is not caused to roll out of its recess by interference between the second outwardly directed engagement recess of the second tubular member and the first seal.

5. The coupling of claim 1, comprising a first insertion channel leading from an outer surface of the coupling to the first inwardly directed engagement recess, to enable the first retainer to be inserted into the first channel in use, and a second insertion channel leading from an outer surface of the coupling to the second inwardly directed engagement recess, to enable the second retainer to be inserted into the second channel, in use.

6. A joint comprising the coupling as claimed in claim 1, wherein a first tubular member is received in the first region of the coupling and a second tubular member is received in the second region of the coupling, and wherein the first tubular member has a larger outer diameter than the second tubular member.

7. The joint of claim 6, wherein the second tubular member has an outwardly directed seal recess carrying a second seal which is arranged to seal against the inner coupling face.

8. The joint of claim 7, wherein the second inwardly directed engagement recess is located between the outwardly directed seal recess and the second end of the coupling.

9. The joint of claim 7, wherein the second seal has an outer diameter, which is smaller than an internal diameter of the first region.

10. The joint of claim 9, wherein the outer diameter of the second seal being smaller than the internal diameter of the first region permits the coupling to be axially displaced relative to the first and/or second tubular members with a clearance between the second seal and the first inwardly directed engagement recess the coupling.

11. The joint of claim 10, wherein during said relative axial displacement, the second seal is not caused to roll out of its recess by interference between the coupling and the second seal.

12. The joint of claim 10, wherein during said relative axial displacement, the second seal is not caused to roll out of its recess by interference between the first inwardly directed engagement recess and the second seal.

13. The joint of claim 6, wherein one of the first and second tubular members is a spigot attached to an accessory.

14. The joint of claim 6, wherein the first inwardly directed engagement recess of the coupling aligns with the first outwardly directed recess of the first tubular member to form the first channel, and the first retainer is received in the first channel to secure the first tubular member in the coupling, and in which the second inwardly directed recess of the coupling aligns with the second outwardly directed recess of the second tubular member to form the second channel, and the second retainer is received in the second channel to secure the second tubular member in the coupling.

15. A method of disassembling the joint as claimed in claim 14, comprising withdrawing the first retainer, withdrawing the second retainer, sliding the coupling toward the second tubular member causing the coupling to disengage from the first tubular member, and moving one of the first and second tubular members laterally relative to the other.

* * * * *